(12) United States Patent
Mania et al.

(10) Patent No.: US 10,030,122 B2
(45) Date of Patent: Jul. 24, 2018

(54) CURABLE COMPOSITIONS

(71) Applicant: WACKER CHEMICAL CORPORATION, Adrian, MI (US)

(72) Inventors: Daniel J. Mania, Saline, MI (US); Uwe Scheim, Coswig (DE)

(73) Assignee: WACKER CHEMICAL CORPORATION, Adrian, MI (US)

( * ) Notice: Subject to any disclaimer, the term of this patent is extended or adjusted under 35 U.S.C. 154(b) by 320 days.

(21) Appl. No.: 14/617,336

(22) Filed: Feb. 9, 2015

(65) Prior Publication Data

US 2016/0230043 A1  Aug. 11, 2016

(51) Int. Cl.
| | |
|---|---|
| *C08K 5/5419* | (2006.01) |
| *C08K 5/544* | (2006.01) |
| *C08K 5/5425* | (2006.01) |
| *C04B 26/32* | (2006.01) |
| *C09D 5/34* | (2006.01) |
| *C08G 59/40* | (2006.01) |
| *C08G 65/336* | (2006.01) |
| *C04B 111/00* | (2006.01) |
| *C04B 111/70* | (2006.01) |

(52) U.S. Cl.
CPC ............ *C08K 5/5419* (2013.01); *C04B 26/32* (2013.01); *C08G 59/4057* (2013.01); *C08G 65/336* (2013.01); *C08K 5/544* (2013.01); *C08K 5/5425* (2013.01); *C09D 5/34* (2013.01); *C04B 2111/00672* (2013.01); *C04B 2111/70* (2013.01); *C08G 2190/00* (2013.01)

(58) Field of Classification Search
CPC .... C08K 5/5419; C08K 5/544; C08K 5/5425; C04B 26/32; C09D 5/34; C08G 59/4057
See application file for complete search history.

(56) References Cited

U.S. PATENT DOCUMENTS

| | | | |
|---|---|---|---|
| 4,833,178 A | 5/1989 | Schaefer et al. | |
| 5,976,371 A | 11/1999 | Giorgini et al. | |
| 6,884,852 B1 | 4/2005 | Klauck et al. | |
| 7,319,128 B2 | 1/2008 | Ziche et al. | |
| 7,332,541 B2 | 2/2008 | Schindler et al. | |
| 7,977,445 B2 | 7/2011 | Hattemer et al. | |
| 8,101,704 B2 | 1/2012 | Baumann et al. | |
| 9,328,259 B1 | 5/2016 | Andrews | |
| 2006/0257281 A1* | 11/2006 | Weide | A61K 31/00 422/6 |
| 2007/0167598 A1 | 7/2007 | Stanjek et al. | |
| 2010/0305263 A1 | 12/2010 | Prasse | |
| 2011/0179743 A1 | 7/2011 | Taylor et al. | |
| 2011/0198030 A1 | 8/2011 | Burckhardt | |
| 2011/0209435 A1 | 9/2011 | Taylor et al. | |
| 2012/0067520 A1 | 3/2012 | Schubert et al. | |
| 2012/0208029 A1 | 8/2012 | Lin | |
| 2013/0034514 A1 | 2/2013 | Schweinsberg | |
| 2014/0007792 A1* | 1/2014 | Posthumus | C04B 28/36 106/272 |
| 2014/0155545 A1 | 6/2014 | Stanjek et al. | |
| 2015/0009566 A1 | 1/2015 | Iyer et al. | |
| 2015/0203729 A1 | 7/2015 | Stanjek et al. | |

FOREIGN PATENT DOCUMENTS

| | | |
|---|---|---|
| DE | 10 2007 023 932 A1 | 11/2008 |
| DE | 10 2011 081 264 A1 | 2/2013 |
| EP | 1 093 482 B1 | 4/2001 |
| EP | 1 641 854 B1 | 4/2006 |
| EP | 1 535 940 A1 | 6/2006 |
| EP | 1 896 523 B1 | 3/2008 |
| EP | 2 189 485 A1 | 5/2010 |
| EP | 2 508 580 A1 | 10/2012 |
| WO | 2005/071165 A1 | 8/2005 |
| WO | 2007072189 A2 | 6/2007 |
| WO | 2011/110384 A1 | 9/2011 |

OTHER PUBLICATIONS

Machine translation of WO 2011/110384. Sep. 15, 2011.*
German Application No. DE 2015 202 278.1, filed Feb. 9, 2015, Applicant: Wacker Chemie AG.

* cited by examiner

*Primary Examiner* — John E Uselding
(74) *Attorney, Agent, or Firm* — Brooks Kushman P.C.

(57) ABSTRACT

A grout compositions, storable with the exclusion of water, and crosslinkable upon ingress of water at room temperature is prepared by admixing a relatively minor proportion of a moisture-curable organopolysiloxanes, composition containing an alkoxysilyl-terminated, urethane-group-containing polymer and a silicone resin, with a major proportion of aggregate.

12 Claims, No Drawings

CURABLE COMPOSITIONS

BACKGROUND OF THE INVENTION

1. Field of the Invention

The invention pertains to polymer grout compositions storable with the exclusion of water, and crosslinkable upon ingress of water at room temperature.

2. Description of the Related Art

The process of grouting has been practiced now for millennia. The Romans, for example, employed a variety of grouts including pozzolanic grouts in building, road, and bath construction, as well as more conventional grouts based on calcined lime without pozzolan. One of the most widespread modern uses of grouting is to seal spaces between adjoining stones or tile, particularly the latter, for example in floors, walls, and particularly in shower enclosures. In the construction of such surfaces, the substrate, for example tile or stone, is adhered to a surface through the use of a tile adhesive, which is generally cementitious. In general, each tile or stone is separated from its neighbors by a relatively uniform distance, thus creating an empty space between the substrates. This empty space is filled with a "grout" of very high mineral content.

Cementitious grouts have been commonly used, and are relatively inexpensive. However, the application of cementitious grouts is labor-intensive and wasteful. For a tile floor or shower enclosure, for example, the dry grout composition is first mixed with water to form a relatively viscous semi-solid mixture, and this mixture is forced into the open spaces between the tiles using a tool. Tools for this use, for example, may be termed grouting floats or grouting paddles. In general, it is impossible to inject grout between tiles with devices such as caulking guns, since many, if not most, grouts are relatively dilatant, and thicken to a reversible, non-extrudable consistency upon application of pressure. By the use of a float, grout can easily be forced into the empty space between tiles and other substrates. However, a significant portion of grout also adheres to the face of the tiles or other substrate. In the case of porous substrates such as brick, the grout must be removed using strong acid. In the case of smooth substrates such as glazed tile, in general, the grout is allowed to partially cure, and then the grout which adheres to the face of the tile is removed with a wet sponge. The wet sponge is also used to smooth the grout to provide a uniform appearance. The craftsman must be careful that the grout does not harden so much that acid is again necessary to remove it. Moreover, the craftsman must also not use a sponge which is too wet, or use too much pressure on the sponge, as this action may actually remove grout from inbetween the substrates.

Cementitious grouts have the advantages of high compressive strength. However, the tensile strength of cementitious grouts is relatively low. The adhesion of cementitious grouts to the sides of the substrate and to the substrate support may vary over a wide range. To improve these qualities, it has been common to add very fine polymer particles to the grout. These polymer particles are preferably of the type referred to as "redispersible polymers" which are characterized by both a very small particle size, as well as film-forming capability. These polymers may be added in the dry state as a powder to the grout in a so-called "ready mix" formulation, or may be added in the form of an aqueous polymer dispersion, which is used in place of at least part and sometimes all of the mix water. The use of these polymers in "polymer-modified grout" can improve the adhesive qualities of the grout, the flexural strength of the grout, the tensile strength of the grout, and in some cases, with proper selection of polymer, the water resistance of the grout. Despite the advantages of polymer-modified grouts, which are somewhat more expensive than ordinary cementitious grouts, the grouting process is still essentially the same as that which has been used since at least Roman times, as discussed previously.

Curable "polymer grouts" have also been proposed. In these grouts, the hydraulically settable components of the cementitious grouts are replaced by curable polymers. For example, so-called "epoxy grouts" have been available for numerous years (e.g. U.S. Pat. No. 4,833,178). These grouts, however, suffer from several disadvantages: firstly, they must be supplied as a two-component mixture; secondly, once mixed, the mixture has little pot life and must be used rapidly; and finally, the chemistry used may be hazardous to the health of the operator. Furthermore it is difficult to remove staining of the tiles which often results in a haze like layer on the surface of the tiles jointed together.

It would be desirable to provide a grout which does not require mixing at the jobsite, which is a one-component rather than a two-component grout, and which is storage stable. It would be further desirable to provide a grout which offers high flexural modulus, good adhesion to substrates, and water resistance. It would be further desirable to provide a grout, despite having polymer components, which can be cleaned using only water, and yet cure to a water resistant grout. Finally, it would be desirable to provide a grout with high solids content which has the appearance of a normal cementitious grout, but which is preferably capable of being extruded from a container such as an ordinary caulking cartridge.

SUMMARY

It has now been surprisingly and unexpectedly discovered that a compositions storable with the exclusion of water, and crosslinkable upon ingress of water at room temperature, useful as a water-free polymer grout, can be prepared by admixing a relatively minor proportion of a moisture-curable organopolysiloxane composition containing an alkoxysilyl-terminated, urethane-group-containing polymer and a silicone resin, with a major proportion of aggregate.

DETAILED DESCRIPTION

The polymer grouts of the subject invention contain a minor portion of a curable silicone mixture containing an alkoxysilyl-terminated, urethane-group-containing polymer, preferably a polyoxyalkylene polymer, and an alkoxy-functional, low viscosity silicone resin. The amount of the curable silicone mixture present is preferably less than about 30 wt. % based on the total weight of the polymer grout, and more preferably about 20 wt. % or less. The curable silicone mixture is generally present in amounts greater than about 2 wt %, more preferably greater than about 5 wt. %, and most preferably greater than about 10 wt. %. Most preferably, the amount of the polymeric content is about 15 wt. %+/−2 wt. %, preferably 15 wt. %, based on the total weight of the polymer grout.

The polymer grouts also contain a major proportion of "aggregate". By the term "aggregate" as used herein, is meant a filler with relatively large particle size. Common fumed silica fillers, and very finely ground quartz and other fillers which have a BET surface area of about 50 $m^2$ per gram or greater are not considered "aggregate" as that term is used herein, nor are large particles such as the gravel and stone used in sidewalk and road construction. Suitable aggregates are, for example, coarsely ground minerals, including limestone, marble, dolomite, quartz, basalt, and other substantially water-insoluble minerals. Very preferred aggregates are those of sand, whether based on quartz minerals, i.e. silica sand, or limestone precursors such as the abraded shells of marine mollusks. The weight average particle size of the aggregate should be from approximately 0.1 mm to less than 1 mm. Aggregate having sieve sizes of 0.02 mm to 1.0 mm (corresponding to US standard mesh 632 to 18), more preferably 0.037 mm to 0.595 mm (corresponding to US standard mesh 400 to 30), and most preferably 0.044 to 0.3 mm (corresponding to US standard mesh 325 to 50), are eminently suitable. Most preferable aggregates include sand and ground limestone with these sizes. More than one type of aggregate may be used, and each type of aggregate may be used in a variety of particle sizes. The aggregates are preferably thoroughly dried before admixing with the curable polymer component. Drying may be accomplished, for example, in pan driers, rotating bed dryers, fluidized bed dryers, and all other dryers suitable for removing traces of moisture from the aggregate. The amount of water remaining in the aggregate after drying should preferably be such that the completed grout is storage stable at 50° C. with the exclusion of moisture for at least one month, and preferably for longer periods of time such as one year or longer.

In addition to the curable polymer components and aggregate, the polymer grout may contain further optional ingredients. One such ingredient which may be useful is a water scavenger. Water scavengers are compounds, particularly reactive silanes or partial hydrolysis products thereof, which react with water to scavenge it from the grout during storage to prevent premature cure. Such reactive silanes are generally more reactive than the alkoxysilyl components in the curable polymer.

Also useful are alkoxysilanes bearing a generally polar or reactive functional group such as an aminoalkyl, epoxyalkyl, or ureidoalkyl group, which serve as an adhesion promoter or a crosslinker. Vinyltrialkoxy silanes such as vinyltrimethoxysilane are also useful for this purpose. Adhesion promoters are well known to those skilled in the art, and in some cases can serve a dual-purpose as a water scavenger and adhesion promoter. Aminoalkyl-functional silanes such as 3-(2-aminoethyl)aminopropyltrimethoxysilane, 3-(2-aminoethyl)aminopropyltriethoxysilane, 3-aminopropyltrimethoxysilane, 3-aminopropyltriethoxysilane, and N-cyclohexyl-3-aminopropyltrimethoxysilane, can also provide a catalytic effect, or in the case of catalyzed systems, the effect of a co-catalyst.

An alkoxysilane used in the examples below is vinyltrimethoxysilane with a dynamic viscosity of 0.6 mPas measured at 25° C. according to DIN 51562, density 0.97 g/cm$^3$ measured at 25° C. according to DIN 51757, boiling point 122° C. at 1013 hPa, methanol content of max. 0.3%, and dimer content max 0.3%. Another alkoxysilane used in the examples below is N-(2-Aminoethyl)-3-aminopropyltrimethoxysilane with a density of 1.03 g/cm$^3$ measured at 25° C. and 1013 hPa according to DIN 51757, refraction index 1.445, active content (amino silanes)>98, flash point>100° C., amine content (mequiv/g) about 8.3 meq/g, and boiling point>147° C. at 16 hPa.

A further optional ingredient is pigmentation. Pigmentation can be used to alter the color of the grout. Both organic pigments and inorganic pigments are suitable, particularly the latter. In some cases the aggregate itself may be colored. Pigments may be used to contribute color or opacity, protect the substrate from UV light, increase hardness, decrease ductility, and/or adjust gloss level. The pigments may be synthetic or natural. Examples of pigments may include clays, calcium carbonate, mica, silicas, talcs, calcined clays, blanc fixe, precipitated calcium carbonate, synthetic pyrogenic silicas, the like, or a combination thereof.

Examples of inorganic pigments may include aluminum pigments such as silicates of sodium and aluminum containing sulfur (ultramarine violet) and a complex naturally occurring pigment of sulfur-containing sodio-silicate $(Na_{8-10}Al_6Si_6O_{24}S_{2-4})$ (ultramarine); barium copper pigments such as Chinese purple $(BaCuSi_2O_6)$ and dark blue $(BaCu_2Si_2O_7)$, copper pigments such as a synthetic pigment of calcium copper silicate $(CaCuSi_4O_{10})$, cupric acetoarsenite $(Cu(C_2H_3O_2)_2 \cdot 3Cu(AsO_2)_2)$; barium pigments such as barium sulfate $(BaSO_4.)$; manganese pigments such as manganic ammonium pyrophosphate $(NH_4MnP_2O_7)$; cobalt pigments such as cobalt stannate $(CoO_3Sn)$, potassium cobaltinitrite $(Na_3Co(NO_2)_6)$, cobalt chromite $(CoCr_2O_4)$, cobalt titanate $(Co_2TiO_4)$; iron pigments such as a synthetic pigment of ferric hexacyanoferrate $(Fe_7(CN)_{18})$, a naturally occurring clay of monohydrated ferric oxide $(Fe_2O_3.H_2O)$, anhydrous $Fe_2O_3$; cadmium pigments such as cadmium sulfide (CdS), cadmium sulfoselenide $(Cd_2SSe)$, cadmium selenide (CdSe); chromium pigments such as chromic oxide $(Cr_2O_3)$, a pigment of hydrated chromic oxide $(Cr_2O_3.H_2O)$, natural pigment of plumbous chromate $(PbCrO_4)$, a naturally occurring pigment mixture composed of lead(II) chromate and lead(II) oxide $(PbCrO_4+PbO)$; arsenic pigments such as monoclinic arsenic sulfide $(As_2S_3)$; lead pigments such as lead antimonite $(Pb(SbO_3)_2$, basic plumbous carbonate $((PbCO_3)_2.Pb(OH)_2)$; mercury pigments such as mercuric sulfide (HgS); carbon pigments such as carbon black; antimony pigments such as stibous oxide $(Sb_2O_3)$; zinc pigments such as zinc oxide (ZnO) or zinc chromate $(ZnCrO_4)$; titanium pigments such as nickel antimony titanium yellow rutile $(NiO.Sb_2O_3.20TiO_2)$ or titanium dioxide $(TiO_2)$; a complex sulfur-containing sodio-silicate $(Na_{8-10}Al_6Si_6O_{24}S_{2-4})$ containing lazurite known as ultramarine blue, or the like.

Examples of organic pigments may include diarylide aniline yellow pigment; benzimidazole yellow dyes; heterocyclic yellow dyes; disazo condensation yellow dyes such as arylide yellow, isoindoline yellow, methane yellow, tetrachloroisoindolinone yellow, azomethine yellow, quinophthalone yellow, or triazinyl yellow, naphthol orange, calrion red, benzimidazolone orange; phthalocyannine green dyes with chemical formula ranging from $C_{32}H_3Cl_{13}CuN_8$ to $C_{32}HCl_{15}CuN_8$, copper phthalocyannine; 8,18-dichloro-5,15-diethyl-5,15-dihydrodiindolo(3,2-b:3',2'-m)tri-phenodioxazine known as diooxazine violet, or the like.

Pigments may include hiding pigments protecting the grout from UV light such as titanium dioxide, optionally coated with silica/alumina/zirconium, phthalocyannine blue dye, or red iron oxide.

The alkoxysilyl polymer is an alkoxysilyl-terminated, urethane-group-containing polymer component of the formula:

$$Y-[(CR^1_2)_b-SiR_a(OR^2)_{3-a}]_x \quad (I),$$

wherein

Y denotes an x-valent polymer radical bonded via nitrogen, oxygen, sulfur, or carbon, R may be identical or different and is a monovalent, optionally substituted, SiC-bonded hydrocarbon radical, R$^1$ may be identical or different and is hydrogen or a monovalent, optionally substituted hydrocarbon radical, which may be bonded to carbon via nitrogen, phosphorus, oxygen, sulfur, or carbonyl group, $R^2$ may be identical or different and is hydrogen or a monovalent, optionally substituted hydrocarbon radical, x is an integer from 1 to 10, preferably 1, 2, or 3, more preferably 1 or 2, a may be identical or different and is 0, 1, or 2, preferably 0 or 1, and b may be identical or different and is an integer from 1 to 10, preferably 1, 3, or 4, more preferably 1 or 3, most preferably 1.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, tert-pentyl radical; hexyl radicals such as the n-hexyl radical; heptyl radicals such as the n-heptyl radical; octyl radicals such as the n-octyl radical, isooctyl radicals, and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl radical and methylcyclohexyl radicals; alkenyl radicals such as the vinyl, 1-propenyl, and the 2-propenyl radical; aryl radicals such as the phenyl, naphthyl, anthryl, and phenanthryl radical; alkaryl radicals such as o-, m-, p-tolyl radicals; xylyl radicals and ethylphenyl radicals; and aralkyl radicals such as the benzyl radical, the α- and the β-phenylethyl radical.

Examples of substituted radicals R are haloalkyl radicals and halo aryl radicals such as the o-, m-, and p-chlorophenyl radical. Radical R preferably comprises monovalent hydrocarbon radicals which are optionally substituted by halogen atoms and which have 1 to 6 carbon atoms, more preferably alkyl radicals having 1 or 2 carbon atoms, most preferably the methyl radical.

Examples of radicals $R^1$ are hydrogen, the radicals specified for R, and also optionally substituted hydrocarbon radicals bonded to carbon via nitrogen, phosphorus, oxygen, sulfur, carbon, or carbonyl group. Preferably, $R^1$ is hydrogen and hydrocarbon radicals having 1 to 20 carbon atoms, most preferably hydrogen.

Examples of radical $R^2$ are hydrogen or the examples specified for radical R. Radical $R^2$ is preferably hydrogen or alkyl radicals which are optionally substituted by halogen atoms and which have 1 to 10 carbon atoms, more preferably alkyl radicals having 1 to 4 carbon atoms, most preferably the methyl and ethyl radical.

Polymer radical Y preferably comprises organic polymer radicals which as polymer chain comprise polyoxyalkylenes such as polyoxyethylene, polyoxypropylene, polyoxybutylene, polyoxytetramethylene, polyoxyethylene-polyoxypropylene copolymer, and polyoxypropylene-polyoxybutylene copolymer; hydrocarbon polymers such as polyisobutylene, polyethylene, or polypropylene, and copolymers of polyisobutylene with isoprene; polyisoprenes; polyurethanes; polyesters, polyamides; polyacrylates; polymetacrylates; and polycarbonates, and which are bonded preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—S—, —O—, and —NR'— to the group or groups —[$(CR^1_2)_b$—$SiR_a(OR^2)_{3-a}$], where R' may be identical or different and has a definition specified for R, or is a group —CH (COOR")—CH$_2$—COOR", in which R" may be identical or different and has a definition specified for R.

Examples of radicals R' are cyclohexyl, cyclopentyl, n-propyl and isopropyl, n-butyl, isobutyl, and tert-butyl radicals, the various stereoisomers of the pentyl radical, hexyl radical, or heptyl radical, and also the phenyl radical. Radical R' is preferably a group —CH(COOR")—CH$_2$—COOR" or an optionally substituted hydrocarbon radical having 1 to 20 carbon atoms, more preferably a linear, branched or cyclic alkyl group having 1 to 20 carbon atoms, or an aryl group which has 6 to 20 carbon atoms and is optionally substituted by halogen atoms. The radicals R" are preferably alkyl groups having 1 to 10 carbon atoms, more preferably methyl, ethyl, or propyl radicals.

More preferably, radical Y in formula (I) comprises polyurethane radicals and polyoxyalkylene radicals, most preferably polyoxypropylene-containing polyurethane radicals or polyoxypropylene radicals.

The alkoxysilyl polymer component may have the groups —[$(CR^1_2)_b$—$SiR_a(OR^2)_{3-a}$] attached at any desired locations within the polymer such as within the chain and/or terminally, preferably within the chain and terminally, more preferably terminally.

Where Y stands for polyurethane radicals, the radicals in question are preferably those whose chain ends are bonded via —NH—C(=O)O—, —NH—C(=O)—NH—, —NR'—C(=O)—NH—, or —NH—C(=O)—NR'—, more preferably via —O—C(=O)—NH— or —NH—C(=O)—NR'—, to the group or groups —[$(CR^1_2)_b$—$SiR_a(OR^2)_{3-a}$], with all of the radicals and indices having one of the definitions given above.

The polyurethane radicals Y are preparable preferably from linear or branched polyoxyalkylenes, more preferably from polypropylene glycols, and from di- or polyisocyanates. These radicals Y preferably have number-average molar masses $M_n$ of 10,000 to 30,000 g/mol, more preferably of 11,000 to 20,000 g/mol. Suitable processes for preparing the alkoxysilyl polymer component, are described in publications including EP 1 093 482 B1 (paragraphs [0014]-[0023], [0039]-[0055] and also inventive example 1 and comparative example 1) and its U.S. equivalent U.S. Pat. No. 6,884,852, and EP 1 641 854 B1 (paragraphs [0014]-[0035], inventive examples 4 and 6, and comparative examples 1 and 2), and its U.S. equivalent U.S. Patent Application 2007/167598, the disclosures of which are incorporated in their entirety by reference herein.

Where Y stands for polyoxyalkylene radicals, the radicals in question are preferably linear or branched polyoxyalkylene radicals, more preferably polyoxypropylene radicals, whose chain ends are bonded preferably via —O—C(=O)—NH— to the group or groups —[$(CR^1_2)_b$—$SiR_a(OR^2)_{3-a}$]. The polyoxyalkylene radicals Y preferably have number-average molar masses $M_n$ of 10,000 to 30,000 g/mol, more preferably of 11,000 to 20,000 g/mol. Suitable processes for preparing the alkoxysilyl polymer component, are described in publications including EP 1 535 940 B1 and its U.S. equivalent U.S. Patent Application 2005/119436 (A1) (paragraphs [0005]-[0025] and also inventive examples 1-3 and comparative examples 1-4) and EP 1 896 523 B1 (paragraphs [0008]-[0047]), and its U.S. equivalent U.S. Patent Application 2010/016537 (A1), the disclosures of which are incorporated in their entirety by reference herein.

The number-average molar mass $M_n$ can be determined by means of Size Exclusion Chromatography (SEC) against polystyrene standard, in THF, at 60° C., a 1.2 ml/min flow rate, and detection by RI (refractive index detector) on a Styragel HR3-HR4-HR5-HR5 column set from Waters Corp. USA, with an injection volume of 100 μl.

The end groups of the alkoxysilyl polymer component are preferably groups of the general formulae:

$$\text{—NH—C(=O)—NR'—(CR}^1{}_2)_b\text{—SiR}_a(\text{OR}^2)_{3-a} \quad \text{(II)}$$

and $$\text{—O—C(=O)—NH—(CR}^1{}_2)_b\text{—SiR}_a(\text{OR}^2)_{3-a} \quad \text{(III),}$$

where the radicals and indices have one of the definitions specified above.

The end groups of the compounds of the alkoxysilyl polymer component are more preferably groups of the formula (III). The compounds of the alkoxysilyl polymer component are preferably silane-terminated polyoxyalkylenes, more preferably silane-terminated polyoxypropylenes, having end groups of the formula (III), where $R^1$ is hydrogen atom, R is methyl radical, $R^2$ is methyl or ethyl radical, b is 1 or 3, and a is 0 or 1. Apart from the end groups (III), these silane-terminated polyoxyalkylenes preferably have exclusively polyether units. The compounds of the alkoxysilyl polymer component preferably possess 2 or 3, more preferably 2, end groups of the formula (III) per molecule.

A great advantage of silane-terminated polyoxyalkylenes having end groups of the formula (III) relative to silane-terminated polyoxyalkylenes with other end groups is their ease of preparability by reaction of common polyoxyalkylenes, terminated with hydroxyl groups, and silanes of the formula:

$$\text{OCN—(CR}^1{}_2)_b\text{—SiR}_a(\text{OR}^2)_{3-a} \quad \text{(IV),}$$

wherein all the radicals and indices have one of the definitions stated above. It is preferable that this reaction achieves largely complete termination of the chain ends present, thereby distinguishing the products resulting from this method significantly from the products of other methods, such as a hydrosilylation of α,ω-unsaturated polymers with SiH-functional silanes, for example. The largely complete termination contributes to better tensile strength and other properties of the alkoxysilyl polymer component, in comparison to polymers whose end groups have been produced by another route, such as via hydrosilylation, for example.

The compounds of the alkoxysilyl polymer component are preferably polymers whose chain ends are terminated to an extent of at least 85%, more preferably at least 90%, most preferably at least 95%, with end groups of the formula (III). Especially preferred as alkoxysilyl polymer component are linear polyoxypropylenes whose chains are terminated to an extent of at least 85%, more preferably at least 90%, more preferably at least 95%, with end groups of the formula (III).

The number-average molecular weights $M_n$ of the compounds of the alkoxysilyl polymer component are preferably at least 10,000 g/mol, more preferably at least 11,000 g/mol, and preferably not more than 30,000 g/mol, more preferably not more than 24,000 g/mol, most preferably not more than 22,000 g/mol.

The viscosity of the compounds of the alkoxysilyl polymer component is preferably at least 0.2 Pas, more preferably at least 1 Pas, most preferably at least 5 Pas, and preferably not more than 700 Pas, more preferably not more than 100 Pas, in each case measured at 20° C.

The compounds of the alkoxysilyl polymer component may comprise only one kind of compound of the formula (I) or mixtures of different kinds of compounds of the formula (I). The compounds of the alkoxysilyl polymer component may contain exclusively compounds of the formula (I) in which more than 90%, preferably more than 95%, more preferably more than 98% of all silyl groups bonded to the radical Y are identical. It is also possible to use compounds of the alkoxysilyl polymer component which consist at least partly of compounds of the formula (I) in which different silyl groups are bonded to a radical Y. Mixtures of different compounds of the formula (I) may be used as compounds of the alkoxysilyl polymer component in which in total at least two different kinds of silyl groups bonded to radicals Y are present, but where all silyl groups each bonded to one radical Y are identical.

If the compounds of the alkoxysilyl polymer component comprise different kinds of compounds of the formula (I), preference is given to mixtures which comprise compounds (A1) having end groups of the formula (II) or (III) in which b=1, $R^1$=H, and a=0 or 1, and also compounds (A2) having end groups of the formula (II) or (III) in which b=3, $R^1$=H, and a=0, and particular preference to those in which the weight ratio of (A1) to (A2) is 0.1 to 10, preferably 0.2 to 5.

The compounds of the alkoxysilyl polymer component are commercial products or can be prepared by methods that are commonplace within chemistry. The alkoxysilyl polymer used in the examples below is α,ω-dimethoxymethylsilylmethylcarbamate terminated polypropylenglycol with an average molecular weight $M_n$ of about 12,500 g/mol.

A catalyst which catalyzes the hydrolysis and condensation of silicon-bonded alkoxy groups may also be necessary in some cases. Such catalysts are well known, and include compounds of tin bismuth, zinc, iron, barium, zirconium and lead, preferably as metal salt carboxylates, and metal octanoates of iron and lead as a tin-free system. Additional suitable catalysts may be catalysts containing a basic nitrogen or phosphorus compound, a phosphorus acid, or carboxylic acid, dibutyl- or dioctyltin compounds. Compounds of the metals lithium, sodium, potassium, magnesium, calcium, or strontium, especially carboxylates of these metals, are also very suitable because they permit rapid crosslinking and their use does not lead to health hazards. But by suitable selection of the alkoxysilyl terminated polymer, it is possible to produce systems with rapid curing times free of catalysts.

The silicone resin component is a low viscosity silicone resin. As is well known in the organopolysiloxane art, the term "resin" has a meaning different from that in other polymer arts. Silicone resins are highly cross-linked, network-like polymers which are generally prepared by the hydrolysis of trichlorosilanes, trialkoxysilanes, tetrachlorosilane, or tetraalkoxysilanes, and mixtures thereof. The molecular weight of the silicone resins may be adjusted through the functionality of the respective silane used in its production. The molecular weight can also be adjusted by the use of monofunctional alkoxysilanes which serve as chain terminators. The viscosity and elasticity of the silicone resins can be adjusted by the addition of difunctional alkoxysilanes. The functionality of the reactive silanes is indicated by the letters M, D, T, and Q, representing monofunctional, difunctional, trifunctional, and tetrafunctional silanes. Preferred silicone resins of the present invention are T resins prepared from only trifunctional silanes, DT resins prepared from functional and trifunctional silanes, MQ resins, prepared from monofunctional and tetrafunctional silanes, and also MDT resins. The amounts of the respective M, D, T, and Q groups in the resin are adjusted in such a manner that the silicone resin is a liquid of low viscosity. In this respect, it is noted that many silicone resins are of sufficiently high molecular weight and of such high crosslink density so as to be solid or of a very high viscosity. These are not useful in the present invention as the silicone resin component, which must be a low viscosity liquid, but may be useful as an additive in addition to the liquid silicone resin component.

The silicone resin component comprises units of the formula

$$R^3{}_c(R^4O)_d SiO_{(4-c-d)/2} \qquad (II),$$

wherein
R³ may be identical or different and denotes hydrogen or a monovalent, SiC-bonded, optionally substituted hydrocarbon radical,
R⁴ may be identical or different and denotes hydrogen or a monovalent, optionally substituted hydrocarbon radical,
c is 0, 1, 2, or 3, and
d is 0, 1, 2, or 3, preferably 0, 1, or 2, more preferably 0 or 1,
wherein the sum of c+d≤3 and in at least 50%, preferably at least 60%, of the units of the formula (II) c=0 or 1.

The silicone resins consist preferably to of at least 90 wt. % of units of the formula (II), more preferably exclusively of units of the formula (II).

Examples of radicals R³ are the examples specified above for R. Radical R³ preferably comprises monovalent, SiC-bonded aliphatic or aromatic hydrocarbon radicals which are optionally substituted by halogen atoms and which have 1 to 18 carbon atoms, more preferably the methyl or phenyl radical. In particular, all radicals R³ are exclusively methyl and phenyl radicals.

Examples of radical R⁴ are hydrogen or the examples specified for radical R. Radical R⁴ preferably comprises hydrogen or alkyl radicals having 1 to 10 carbon atoms that are optionally substituted by halogen atoms, more preferably hydrogen or alkyl radicals having 1 to 4 carbon atoms, more particularly the methyl, ethyl, or butyl radical, most preferably the methyl radical.

The silicone resins are preferably phenylsilicone resins, preferably consisting of exclusively units of the formula (II) in which at least 10%, preferably at least 50%, more preferably at least 60% of all units of the formula (II) have at least one SiC-bonded phenyl group. The phenylsilicone resins may contain, based in each case on the total number of units of the formula (II), at least 50%, more preferably at least 60%, of units of the formula (II) in which c is 1.

The silicone resins may have exclusively units of the formula (II) in which c is 0, 1 or 2, with the proviso that c=0 or 1 in at least 50% of the units of the formula (II). Alternatively, the silicone resins may have exclusively units of the formula (II) in which c is 1 or 2 or in which c is 1. Preferably, the silicone resins have, based in each case on the total number of units of the formula (II), at least 70%, more preferably at least 80%, of units of the formula (II) in which d is 0 or 1. Preferably, the silicone resins have, based in each case on the total number of units of the formula (II), 30% to 95%, more preferably 30% to 90%, of units of the formula (II) in which d is 0.

Examples of silicone resins are organopolysiloxane resins which consist substantially, preferably exclusively, of Q units of the formulae $SiO_{4/2}$, $Si(OR^4)O_{3/2}$, $Si(OR^4)_2O_{2/2}$ and $Si(OR^4)_3O_{1/2}$, T units of the formulae $PhSiO_{3/2}$, $PhSi(OR^4)O_{2/2}$ and $PhSi(OR^4)_2O_{1/2}$, D units of the formulae $Me_2SiO_{2/2}$ and $Me_2Si(OR^4)O_{1/2}$, and also M units of the formula $Me_3SiO_{1/2}$, where Me is a methyl radical, Ph is a phenyl radical, and R⁴ is methyl, ethyl or butyl radical, preferably methyl radical, with the resin containing preferably 0-2 mol of Q units, 0-2 mol of D units, and 0-2 mol of M units per mol of T units.

Preferred examples of silicone resins are organopolysiloxane resins which consist substantially, preferably exclusively, of T units of the formulae $PhSiO_{3/2}$, $PhSi(OR^4)O_{2/2}$ and $PhSi(OR^4)_2O_{1/2}$ and T units of the formulae $MeSiO_{3/2}$, $MeSi(OR^4)O_{2/2}$ and $MeSi(OR^4)_2O_{1/2}$, and also, optionally, D units of the formulae $Me_2SiO_{2/2}$ and $Me_2Si(OR^4)O_{1/2}$, where Me is a methyl radical, Ph is a phenyl radical, and R⁴ is methyl, ethyl or butyl radical, preferably methyl radical. The molar ratio of phenylsilicone to methylsilicone units is between 0.5 and 2.0. The amount of D units is preferably below 10 wt. %. Preferred examples of silicone resins are also organopolysiloxane resins which consist substantially, preferably exclusively, of T units of the formulae $PhSiO_{3/2}$, $PhSi(OR^4)O_{2/2}$ and $PhSi(OR^4)_2O_{1/2}$ where Ph is phenyl radical and R⁴ is methyl, ethyl or butyl radical, preferably methyl radical.

The silicone resins preferably possess a number-average molar mass $M_n$ of at least 400 g/mol and more preferably of at least 600 g/mol. The average molar mass $M_n$ is preferably not more than 400,000 g/mol, more preferably not more than 100,000 g/mol, most preferably not more than 50,000 g/mol. The silicone resins may be either solid or liquid at 23° C. and 1000 hPa, with liquid silicone resins being preferred.

The silicone resins may be prepared by methods which are commonplace within chemistry, and/or are commercial products, such as the products SILRES® IC 368, SILRES® IC 678, or SILRES® SY231, GENIOSIL® LX 368, GENIOSIL® LX 678 for example, available commercially from Wacker Chemie AG, Munich (DE). The methyl-phenyl silicone resin used in the examples below are methoxyfunctional methyl-phenyl polysiloxane with kinematic viscosity of 280 mm²/s at 25° C. and T functional, low molecular weight methyl siloxane with the average composition $(MeSiO_{3/2})_{0.38}(MeSi(OEt)O_{2/2})_{0.46}(MeSi(OEt)_2O_{1/2})_{0.15}(Me_2SiO_{2/2})_{0.01}$ with molecular weights $M_w$=2800 g/mol, $M_n$=1000 g/mol.

The silicone resins may be used either in pure form or in the form of a solution in a suitable solvent. While preference is given to silicone resins which are free from organic solvents, solvents which may be used include substances such as ethers (e.g., diethyl ether, methyl tert-butyl ether, ether derivatives of glycol, THF), esters (e.g., ethyl acetate, butyl acetate, glycol esters), hydrocarbons (e.g., pentane, cyclopentane, hexane, cyclohexane, heptane, octane, or else longer-chain, branched and unbranched alkanes), ketones (e.g., acetone, methyl ethyl ketone), aromatics (e.g., toluene, xylene, ethylbenzene, chlorobenzene), or alcohols (e.g., methanol, ethanol, glycol, propanol, isopropanol, glycerol, butanol, isobutanol, tert-butanol).

An additional component of the inventive grout is a surfactant or a mixture of surfactants which aid in cleanability of the substrate to which the grout is being applied. The surfactant improves clean-ability after application so that any grout residue can be easily removed from the substrate such as tile, for example by wiping the residue away with a wet sponge. The surfactant may be a low molecular weight surfactant. The surfactant may be a cationic, anionic, or non-ionic surfactant. Preferably, the surfactant is a non-ionic surfactant. More preferably, the surfactant is a fluorosurfactant. The fluorosurfactant may be any synthetic organofluorine chemical compound that has multiple fluorine atoms. The surfactant may be polyfluorinated or perfluorinated. Preferably, the fluorosurfactant used is not toxic, bioaccumulative, or otherwise adversely affecting human health and environment. The fluorosurfactant used in the examples below is non-ionic polymeric fluorosurfactant with viscosity of 3000-6000 measured at 25° C., specific gravity 1.21 g/cc, vapor pressure 0.07 mm Hg, flash point 82° C., and Tg 15-20° C. In view of the relatively hydrophobic nature of the organopolysiloxane ingredients, it was highly surprising and unexpected that a minor amount of surfactant provided the advantage of water clean-up.

The relative amounts of components are listed herein in weight percent based on 100% of the whole ingredients as mixed together before exposing to moisture and before curing. The relative amount of the alkoxysilyl polymer component may be 0.1-10 wt. %; preferably 0.1-4 wt. %, most preferably 0.7-2.1 wt. %.

The relative amount of the silicone resin may be 0.1-30 wt. %, more preferably 0.1-20 wt. %, most preferably 1.5-15 wt. %. The relative amount of the silicone resin component when a mixture of silicone resins is used may be, for example, 0-20 wt. % of a methyl-phenyl resin and 0-6 wt. % of a T functional, low molecular weight methyl siloxane; more preferably 5-15 wt. % of the methyl-phenyl resin and 1.5-5 wt. % of the T functional, low molecular weight methyl siloxane, most preferably 10-14 wt. % of a methyl-phenyl resin and 2-3 wt. % of a T functional, low molecular weight methyl siloxane.

The relative amount of the optional alkoxy silane component may be 0-5 wt. %, more preferably 0-3 wt. %, most preferably 0.1-1.6 wt. %. When more than one alkoxy silane is used, the relative amounts may be, for example, 0-2 wt. % of N-(2-Aminoethyl)-3-aminopropyltrimethoxysilane and 0-2 wt. % of vinyltrimethoxysilane, more preferably 0-1 wt. % of N-(2-Aminoethyl)-3-aminopropyltrimethoxysilane and 0-1 wt. % of vinyltrimethoxysilane, most preferably 0.1-0.8 wt. % of N-(2-Aminoethyl)-3-aminopropyltrimethoxysilane and 0.1-0.8 wt. % of vinyltrimethoxysilane.

The relative amount of the surfactant may be 0.1-5 wt. %; preferably 0.1-3 wt. %, more preferably 0.2-1.5 wt. %, most preferably 0.5-0.9 wt. %.

The relative amounts of the aggregate may be 50-95 wt. %, more preferably 60-90 wt. %. Preferably more than one kind of aggregate is used. For example, the relative amounts of different aggregates may be 0-90 wt. % of calcium carbonate with mean particle size 15-25 μm, 0-30 wt. % of sodium-potassium alumina silicate, 0-15 wt. % of calcium carbonate with mean particle size of less than 10 μm. Preferably, the relative amounts of different aggregates are 50-85 wt. % of calcium carbonate with mean particle size 15-25 μm, 7-25 wt. % of sodium-potassium alumina silicate, and 1.5-11 wt. % of calcium carbonate with mean particle size of less than 10 μm.

The relative amount of adhesion promoters, water scavengers, catalysts, additives, and any other optional ingredient may be 0-10 wt. %, preferably 0-8 wt. %, more preferably 0-5 wt. %.

Based on a composition having 700 parts by weight in total, based on the weight of whole ingredients as mixed together before exposing to moisture and before curing, the relative amount of the components may be as described herein. "Parts" means parts by weight unless otherwise noted. The relative amount of the alkoxysilyl polymer component may be 1-75 parts, more preferably 1-50 parts, most preferably 5-15 parts.

The relative amount of the silicone resin may be 1-300 parts, more preferably 1-150 parts, and most preferably 1-100 parts. The relative amount of the silicone resin component when a mixture of silicone resins is used may be, for example, 0-200 parts of a methyl-phenyl resin and 0-100 parts of a T functional, low molecular weight methyl siloxane; more preferably 40-150 parts of the methyl-phenyl resin and 5-50 parts of the T functional, low molecular weight methyl siloxane, most preferably 80-100 parts of the methyl-phenyl resin and 10-30 parts of the T functional, low molecular weight methyl siloxane.

The relative amount of the optional alkoxy silane component may be 0-20 parts; preferably 0-15 parts, more preferably 0-10 parts. When more than one alkoxy silane is used, the relative amounts may be, for example, 0-15 parts of N-(2-Aminoethyl)-3-aminopropyltrimethoxysilane and 0-15 parts of vinyltrimethoxysilane, more preferably 1-10 of N-(2-Aminoethyl)-3-aminopropyltrimethoxysilane and 1-10 parts of vinyltrimethoxysilane.

The relative amount of the surfactant may be 0.7-35 parts; preferably 1-20 parts, more preferably 1-10 parts, most preferably 1-8 parts.

The relative amounts of the aggregate may be 250-600 parts, preferably 400-630 parts, more preferably 450-500 parts. Preferably more than one kind of aggregate is used. For example, the relative amounts of different aggregates may be 0-600 parts of calcium carbonate with mean particle size 15-25 μm, 0-500 parts of sodium-potassium alumina silicate, 0-250 parts of calcium carbonate with mean particle size of less than 10 μm while at least one type of aggregate has to be represented. Preferably the amounts are 400-600 parts of calcium carbonate with mean particle size 15-25 μm, 50-150 parts of sodium-potassium alumina silicate, and 10-500 of calcium carbonate with mean particle size of less than 10 μm.

The relative amount of adhesion promoters, water scavengers, catalysts, additives, and any other optional ingredient may be 0-30 parts, preferably 1-10 parts, more preferably 1-8 parts.

A method of preparation of an exemplary grout comprising the alkoxysilyl component, the silicone resin component of the general formulas described above, the surfactant and aggregate, as described above, is provided in the Examples listed below.

Example 1: Preparation of a Grout Comprising a Minor Portion of a Curable Silicone Mixture and a Large Portion of Aggregate Comprising Calcium Carbonate and Sodium Potassium Alumina Silicate A grout was prepared according to the following method utilizing the following compositions and weight percentages:

| INCI Name | Amount (g) | Amount (wt. %) |
|---|---|---|
| dimethoxymethylsilylmethylcarbamate-terminated polyether | 10 | 1.4 |
| methyl-phenyl resin | 90 | 12.9 |
| T functional, low molecular weight methyl siloxane | 20 | 2.9 |

-continued

| INCI Name | Amount (g) | Amount (wt. %) |
|---|---|---|
| N-(2-Aminoethyl)-3-aminopropyltrimethoxysilane | 3 | 0.4 |
| vinyltrimethoxysilane | 3 | 0.4 |
| fluorosurfactant | 6 | 0.9 |
| calcium carbonate with mean particle size 15-25 μm | 475 | 68.1 |
| sodium-potassium alumina silicate | 75 | 10.8 |
| calcium carbonate with mean particle size of less than 10 μm | 15 | 2.2 |
| Total | 697 | 100.0 |

The grout in Example 1 was prepared by the following steps:

Hobart® 50N (ASTM Version) mixer was used to mix the components. The lowest setting (1) was used to mix the silicone resin component and liquid components. The lowest setting (1) was used initially while the aggregate was being added. But settings (2) may be used, and potentially, setting (3) may be used if the mixture is of sufficiently thick consistency (high viscosity).

The dimethoxy(methyl)silylmethylcarbamate-terminated polyether, the methyl-phenyl resin of the average composition $(MeSiO_{3/2})_{0.10}(MeSi(OMe)O_{2/2})_{0.17}(MeSi(OMe)_2O_{1/2})_{0.03}(PhSiO_{3/2})_{0.15}(PhSi(OMe)O_{2/2})_{0.31}(PhSi(OMe)_2O_{1/2})_{0.20}(Me_2SiO_{2/2})_{0.04}$ with the molecular weights $M_w=1800$ g/mol, $M_n=900$ g/mol, and the T functional, low molecular weight methyl siloxane of the average composition $(MeSiO_{3/2})_{0.38}(MeSi(OEt)O_{2/2})_{0.46}(MeSi(OEt)_2O_{1/2})_{0.15}(Me_2SiO_{2/2})_{0.01}$ with molecular weights $M_w=2800$ g/mol, $M_n=1000$ g/mol were pre-mixed for 2 minutes of setting 1 of the mixer to obtain a resin mixture. N-(2-Aminoethyl)-3-aminopropyltrimethoxysilane was then added, and the resin mixture was mixed for 1 minute on setting 1. Subsequently, vinyltrimethoxysilane was added, and the resin mixture was mixed for 1 minute on setting 1. Afterwards, the fluorosurfactant was added, and the resin mixture was again mixed for 1 minute on setting 1. Meanwhile an aggregate mixture was prepared by mixing calcium carbonate with mean particle size 15-25 μm with calcium carbonate with mean particle size of less than 10 μm, and with sodium-potassium alumina silicate to create an aggregate mixture. The aggregate mixture was slowly added to the resin mixture while mixing on setting 1 until the resin mixture was unable to wet the aggregate mixture. At that point, no further aggregate was added while the resin mixture continued to be mixed. The speed was occasionally increased until the aggregate mixture became wet. The remaining amount of the aggregate mixture was added in the same manner. When the material reached desired consistency, the resulting mixture continued to be mixed on speed 1 for additional 5 minutes. The resulting mixture was then placed in a container, capped with nitrogen blanket, and sealed for later use.

If the resulting mixture does not have the desired consistency such as the mixture is too thick, the desired consistency can be achieved by adding small aliquots of all of the liquid and resinous raw materials pre-mixed in appropriate ratios. Alternatively, if the mixture is too thin, the desired consistency can be achieved by adding small aliquots of additional aggregate mixture.

To assess desirable properties of the grout, examples of the grout 2-10 were prepared. As is apparent from the tables below, examples 2 and 3 differ by relative amounts of the alkoxysilyl polymer and the methyl-phenyl resin. Examples 4-6 contain different amount of T functional, low molecular weight methyl siloxane. Examples 7 and 8 contain different amounts of the fluorosurfactant. Example 9 and 10 differ by the amounts of filler.

Examples 2-10: Preparation of Additional Grout Examples

These additional exemplary useful grouts materials were prepared as in Example 1 according to the method described above utilizing the following compositions and weight percentages.

Example 2

| INCI Name | Amount (g) | Amount (wt. %) |
|---|---|---|
| dimethoxymethylsilylmethylcarbamate-terminated polyether | 20.0 | 1.7 |
| methyl-phenyl resin | 180.0 | 15.35 |
| T functional, low molecular weight methyl siloxane | 50.0 | 4.26 |
| N-(2-Aminoethyl)-3-aminopropyltrimethoxysilane | 20.0 | 1.70 |
| vinyltrimethoxysilane | 20.0 | 1.70 |
| fluorosurfactant | 2.5 | 0.21 |
| calcium carbonate with mean particle size 15-25 μm | 774.0 | 66.01 |
| sodium-potassium alumina silicate | 108.0 | 9.21 |
| calcium carbonate with mean particle size of less than 10 μm | 18.0 | 1.54 |
| Total | 1172.5 | 100.00 |

Example 3

| INCI Name | Amount (g) | Amount (wt. %) |
|---|---|---|
| dimethoxymethylsilylmethylcarbamate-terminated polyether | 200.0 | 20.15 |
| methyl-phenyl resin | 0.0 | 0.00 |
| T functional, low molecular weight methyl siloxane | 50.0 | 5.04 |
| N-(2-Aminoethyl)-3-aminopropyltrimethoxysilane | 20.0 | 2.02 |
| vinyltrimethoxysilane | 20.0 | 2.02 |
| fluorosurfactant | 2.5 | 0.25 |
| calcium carbonate with mean particle size 15-25 μm | 774.0 | 77.98 |
| sodium-potassium alumina silicate | 108.0 | 10.88 |
| calcium carbonate with mean particle size of less than 10 μm | 18.0 | 1.81 |
| Total | 992.5 | 100.00 |

Individual molds measuring 5.08 cm×5.08 cm (2×2 inches) were filled with grout Examples 2 and 3 until the thickness of the grout material reached about 0.95 cm (⅜ inch). The examples were allowed to dry for 2-3 days in the mold. Afterwards, the examples were pulled out of the mold and turned face down to prevent exposure to air. The examples were then allowed to dry for additional 7 days.

The test data collected for Examples 2 and 3 are provided in the tables below:

| Example No. | Dry Shore D Durometer | 24-h Water Absorption (%) | Wet Shore D Durometer |
|---|---|---|---|
| 2 | 67 | 0.25 | 68 |
| 3 | 34 | 1.49 | 19 |

| Example No. | Tensile Strength (psi) | Tensile Strength (MPa) | Elongation (%) | Flexural Strength (psi) | Flexural Strength (MPa) |
|---|---|---|---|---|---|
| 2 | 700 | 4.83 | 1 | 2514 | 17.33 |
| 3 | 1178 | 8.12 | 6 | 490 | 3.38 |

Dry Shore D Durometer was measured after the 7-day period of drying. After the Dry Shore D Durometer assessment was completed, the examples were weighted and submerged in water so that about 1.54 cm (1 inch) of water covered each example for a period of 24 hours. After 24 hours, the examples were removed from the water, weighted, and Wet Shore D Durometer was measured to assess what effect water has on the Durometer D values when the grout becomes wet.

The tensile strength was measured according to modified ASTM C 307 method, using samples cast into individual molds measuring 5.08 cm (2 inches) in length, shaped like dog bones, which were filled with grout Examples A-C until the thickness reached about 0.9 cm (¼ inch). The examples were allowed to dry for 2-3 days in the mold. Afterwards, the examples were pulled out of the mold and turned face down to prevent exposure to air. The examples were then allowed to dry for additional 7 days.

The flexural strength was measured according ISO 178: 2011-04 method A, using a speed of 2 mm/min and a distance of the supporting pins of 60 mm. Samples with the dimensions length×width×thickness=80 mm×10 mm×4 mm were prepared using a PTFE mold having a cavity with a depth of the thickness of the samples. The examples were allowed to dry for 2-3 days in the molds. Afterwards, the examples were pulled out of the molds and turned face down to prevent exposure to air. The examples were then allowed to dry for additional 7 days and flexural strength was measured.

All testing was done at about 50% humidity and 21.1° C. (70° F.) in the laboratory.

Example 4

| INCI Name | Amount (g) | Amount (wt. %) |
|---|---|---|
| dimethoxymethylsilylmethylcarbamate-terminated polyether | 20.0 | 1.76 |
| methyl-phenyl resin | 180.0 | 15.82 |
| T functional, low molecular weight methyl siloxane | 15.00 | 1.32 |
| N-(2-Aminoethyl)-3-aminopropyltrimethoxysilane | 20.0 | 1.76 |
| vinyltrimethoxysilane | 20.0 | 1.76 |
| fluorosurfactant | 2.5 | 0.22 |
| calcium carbonate with mean particle size 15-25 μm | 774.0 | 68.04 |
| sodium-potassium alumina silicate | 108.0 | 9.49 |
| calcium carbonate with mean particle size of less than 10 μm | 18.0 | 1.58 |
| Total | 1137.5 | 100.00 |

Example 5

| INCI Name | Amount (g) | Amount (wt. %) |
|---|---|---|
| dimethoxymethylsilylmethylcarbamate-terminated polyether | 20.0 | 1.74 |
| methyl-phenyl resin | 180.0 | 15.62 |
| T functional, low molecular weight methyl siloxane | 30.0 | 2.60 |
| N-(2-Aminoethyl)-3-aminopropyltrimethoxysilane | 20.0 | 1.74 |
| vinyltrimethoxysilane | 20.0 | 1.74 |
| fluorosurfactant | 2.5 | 0.22 |
| calcium carbonate with mean particle size 15-25 μm | 774.0 | 67.16 |
| sodium-potassium alumina silicate | 108.0 | 9.37 |
| calcium carbonate with mean particle size of less than 10 μm | 18.0 | 1.56 |
| Total | 1152.5 | 100.00 |

Example 6

| INCI Name | Amount (g) | Amount (wt. %) |
|---|---|---|
| dimethoxymethylsilylmethylcarbamate-terminated polyether | 20.0 | 1.71 |
| methyl-phenyl resin | 180.0 | 15.42 |
| T functional, low molecular weight methyl siloxane | 45.0 | 3.85 |
| N-(2-Aminoethyl)-3-aminopropyltrimethoxysilane | 20.0 | 1.71 |
| vinyltrimethoxysilane | 20.0 | 1.71 |
| fluorosurfactant | 2.5 | 0.21 |
| calcium carbonate with mean particle size 15-25 μm | 774.0 | 66.30 |
| sodium-potassium alumina silicate | 108.0 | 9.25 |
| calcium carbonate with mean particle size of less than 10 μm | 18.0 | 1.54 |
| Total | 1167.5 | 100.00 |

Example 7

| INCI Name | Amount (g) | Amount (wt. %) |
|---|---|---|
| dimethoxymethylsilylmethylcarbamate-terminated polyether | 20.0 | 1.70 |
| methyl-phenyl resin | 180.0 | 15.27 |
| T functional, low molecular weight methyl siloxane | 50.0 | 4.24 |
| N-(2-Aminoethyl)-3-aminopropyltrimethoxysilane | 20.0 | 1.70 |
| vinyltrimethoxysilane | 20.0 | 1.70 |
| fluorosurfactant | 9.00 | 0.76 |
| calcium carbonate with mean particle size 15-25 μm | 774.0 | 65.65 |
| sodium-potassium alumina silicate | 108.0 | 9.16 |
| calcium carbonate with mean particle size of less than 10 μm | 18.00 | 1.53 |
| Total | 1179.00 | 100.00 |

Example 8

| INCI Name | Amount (g) | Amount (wt. %) |
|---|---|---|
| dimethoxymethylsilylmethylcarbamate-terminated polyether | 20.0 | 1.68 |
| methyl-phenyl resin | 180.0 | 15.15 |
| T functional, low molecular weight methyl siloxane | 50.0 | 4.21 |
| N-(2-Aminoethyl)-3-aminopropyltrimethoxysilane | 20.0 | 1.68 |
| vinyltrimethoxysilane | 20.0 | 1.68 |
| fluorosurfactant | 18.00 | 1.52 |

-continued

| INCI Name | Amount (g) | Amount (wt. %) |
|---|---|---|
| calcium carbonate with mean particle size 15-25 μm | 774.0 | 65.15 |
| sodium-potassium alumina silicate | 108.0 | 9.09 |
| calcium carbonate with mean particle size of less than 10 μm | 18.0 | 1.52 |
| Total | 1188.0 | 100.00 |

Example 9

| INCI Name | Amount (g) | Amount (wt. %) |
|---|---|---|
| dimethoxymethylsilylmethylcarbamate-terminated polyether | 20.0 | 1.89 |
| methyl-phenyl resin | 180.0 | 17.02 |
| T functional, low molecular weight methyl siloxane | 50.0 | 4.73 |
| N-(2-Aminoethyl)-3-aminopropyltrimethoxysilane | 20.0 | 1.89 |
| vinyltrimethoxysilane | 20.0 | 1.89 |
| fluorosurfactant | 2.5 | 0.24 |
| calcium carbonate with mean particle size 15-25 μm | 657.90 | 62.21 |
| sodium-potassium alumina silicate | 91.80 | 8.68 |
| calcium carbonate with mean particle size of less than 10 μm | 15.30 | 1.45 |
| Total | 1037.5 | 100.00 |

Example 10

| INCI Name | Amount (g) | Amount (wt. %) |
|---|---|---|
| dimethoxymethylsilylmethylcarbamate-terminated polyether | 20.0 | 1.78 |
| methyl-phenyl resin | 180.0 | 16.06 |
| T functional, low molecular weight methyl siloxane | 50.0 | 4.46 |
| N-(2-Aminoethyl)-3-aminopropyltrimethoxysilane | 20.0 | 1.78 |
| vinyltrimethoxysilane | 20.0 | 1.78 |
| fluorosurfactant | 2.5 | 0.22 |
| calcium carbonate with mean particle size 15-25 μm | 712.08 | 63.55 |
| sodium-potassium alumina silicate | 99.36 | 8.87 |
| calcium carbonate with mean particle size of less than 10 μm | 16.56 | 1.48 |
| Total | 1100.5 | 100.00 |

Individual molds measuring 5.08 cm×5.08 cm (2×2 inches) were filled with grout Examples 4-10 until the thickness reached about 0.95 cm (⅜ inch). The examples were allowed to dry for 2-3 days in the mold. Afterwards, the examples were pulled out of the mold and turned face down to prevent exposure to air. The examples were then allowed to dry for additional 7 days. Dry Shore D Durometer, tensile strength, and elongation was measured afterwards at about 50% humidity and 21.1° C. (70° F.) in the laboratory according to the methods described above.

The test data collected for Examples 2 and 4-10 are provided in the table below:

| Example No. | Dry Shore D Durometer | Tensile Strength (psi) | Tensile Strength (MPa) | Elongation (%) |
|---|---|---|---|---|
| 4 | 46.0 | 1536 | 10.59 | 1 |
| 5 | 54.0 | 2000 | 13.79 | 1 |
| 6 | 65.0 | 2700 | 18.62 | 1 |
| 7 | 65.6 | 2809 | 19.37 | 2 |
| 8 | 58.6 | 1602 | 11.05 | 2 |
| 9 | 49.0 | 1830 | 12.62 | 3 |
| 10 | 51.0 | 2015 | 13.89 | 2 |
| 2 | 65.6 | 2809 | 19.37 | 2 |

Example 6, having the highest concentration of the T functional, low molecular weight methyl siloxane resin, exhibited the highest Dry Shore D Durometer and tensile strength when compared to Examples 4 and 5 having lower concentrations of the T functional, low molecular weight methyl siloxane resin. Example 7, having lower concentration of the fluorosurfactant than Example 8, exhibited higher Dry Shore D Durometer and tensile strength. But elongation of Examples 7 and 8, having higher concentration of the fluorosurfactant than Examples 4-6 was higher than elongation of Examples 4-6. Examples 9 and 10, having lower concentration of aggregate than Example 2, exhibited lower Dry Shore D Durometer and tensile strength than Example 2.

Examples 11-18: Preparation of Additional Exemplary Grout Examples Comprising a Large Portion of Aggregate Including Sand Additional exemplary useful grout materials were prepared as in Example 1 according to the method described above utilizing the following compositions and weight percentages.

Examples 11-18: Aggregate Comprising Calcium Carbonate and Sand

| | Example No. | | | | | | | |
|---|---|---|---|---|---|---|---|---|
| INCI Name | 11 | 12 | 13 | 14 | 15 | 16 | 17 | 18 |
| | Amount (wt. %) | | | | | | | |
| dimethoxymethylsilyl methylcarbamate-terminated polyether | 1.5 | 1.5 | 3.75 | 3.75 | 7.5 | 7.5 | 13.5 | 13.5 |
| methyl-phenyl resin | 13.5 | 13.5 | 11.25 | 11.25 | 7.5 | 7.5 | 1.5 | 1.5 |
| N-(2-Aminoethyl)-3-aminopropyltrimethoxysilane | 2.5 | 2.5 | 2.5 | 2.5 | 2.5 | 2.5 | 2.5 | 2.5 |
| vinyltrimethoxysilane | 2.0 | 2.0 | 2.0 | 2.0 | 2.0 | 2.0 | 2.0 | 2.0 |
| polypropylene glycol | 10.5 | 10.5 | 10.5 | 10.5 | 10.5 | 10.5 | 10.5 | 10.5 |
| calcium carbonate | 52.5 | 17.5 | 52.5 | 17.5 | 52.5 | 17.5 | 52.5 | 17.5 |
| sand | 17.5 | 52.5 | 17.5 | 52.5 | 17.5 | 52.5 | 17.5 | 52.5 |

The grout Examples 11-18 were deposited in individual molds as was described above regarding Examples 2-10. The examples were allowed to dry for 3 days in the mold. Dry Shore D Durometer was measured at this point. Afterwards, the examples were pulled out of the mold and turned face down to prevent exposure to air. The examples were then allowed to dry for additional 7 days. After the 7-day drying period, Dry Shore D Durometer was again measured, the examples weighted and submerged in water so that about 1.54 cm (1 inch) of water was above each example for a period of 24 hours. After 24 hours, the examples were removed from the water, weighted, and Wet Shore D Durometer was measured.

Additionally, stain repellency was assessed using Ceramic Tile Institute of America's Field Report T-72 Stain Test. A staining solution was applied to the clean and dry surface of Examples 11-18. A staining solution may comprise one or more of the following solutions: ketchup, mustard, vegetable oil such as soy bean oil, Wesson® oil, olive oil, vinegar, red wine, black coffee, soft drink with colorants, lemon juice concentrate, red cough syrup, snow cone syrup, soy sauce, sports themed energy drinks, water, the like, or a combination thereof. After four hours, the remaining or excess surface staining solutions was wiped with an absorbent paper towel. The examples were subsequently scrubbed 10 times (one scrub is back and forth once) under tap water using white nylon scrub pad followed by drying the excess moisture with an absorbent paper towel. The examples were allowed to dry 24 hours at room temperature before staining was assessed. Staining was assessed on a 0-40 scale, 0 being stain free.

The test data collected for Examples 11-18 are provided in the table below:

| Example No. | 3-day Dry Shore D Durometer | 24-h Water Absorption (%) | 7-day Dry Shore D Durometer | Wet Durometer | Stain Repellency |
|---|---|---|---|---|---|
| 11 | 38 | 4.08 | 65 | 62 | 6.5 |
| 12 | 23 | 2.78 | 50 | 48 | 9.0 |
| 13 | 31 | 3.51 | 63 | 61 | 7.0 |
| 14 | 20 | 2.06 | 55 | 53 | 9.0 |
| 15 | 19 | 1.83 | 45 | 41 | 10.0 |
| 16 | 7 | 1.67 | 37 | 35 | 19.0 |
| 17 | 3 | 9.49 | 30 | 27 | 21.0 |
| 18 | 2 | 8.39 | 33 | 30 | 21.0 |

Examples 19 and 20: Preparation of Additional Exemplary Grout Examples Comprising a Large Portion of Aggregate Including Sand, Calcium Carbonate, Fumed Silica, or a Combination Thereof Additional exemplary useful grout materials with the aggregate component comprising sand only, a mix of sand with calcium carbonate, or a combination of sand, chalk, and fumed silica were prepared as in Example 1 according to the method described above utilizing the following compositions and weight percentages.

Example 21: Aggregate Material Consisting of Sand and Calcium Carbonate

| INCI Name | Amount (g) | Amount (wt. %) |
|---|---|---|
| dimethoxymethylsilylmethylcarbamate-terminated polyether | 20 | 1.59 |
| methyl-phenyl resin | 180 | 14.29 |
| T functional, low molecular weight methyl siloxane | 40 | 3.17 |
| N-(2-Aminoethyl)-3-aminopropyltrimethoxysilane | 5 | 0.40 |
| vinyltrimethoxysilane | 5 | 0.40 |
| fluorosurfactant | 10 | 0.80 |
| sand with sieve size = 0.33/0.25 mm (standard mesh 50/60) | 510 | 40.47 |
| sand with sieve size = 0.25/0.21 mm (standard mesh 60/70) | 310 | 24.60 |
| calcium carbonate sieve size = 0.044 mm (standard mesh 325) | 180 | 14.29 |
| Total | 1260 | 100.00 |

Example 20: Aggregate Material Consisting of Sand

| INCI Name | Amount (g) | Amount (wt. %) |
|---|---|---|
| dimethoxymethylsilylmethylcarbamate-terminated polyether | 20 | 1.59 |
| methyl-phenyl resin | 180 | 14.29 |
| T functional, low molecular weight methyl siloxane | 40 | 3.17 |
| N-(2-Aminoethyl)-3-aminopropyltrimethoxysilane | 5 | 0.40 |
| vinyltrimethoxysilane | 5 | 0.40 |
| fluorosurfactant | 10 | 0.80 |
| sand with sieve size = 0.33/0.25 mm (standard mesh 50/60) | 600 | 47.62 |
| sand with sieve size = 0.25/0.21 mm (standard mesh 60/70) | 350 | 27.78 |
| sand with sieve size = 0.21/0.177 mm (standard mesh 70/80) | 50 | 3.97 |
| Total | 1260 | 100.00 |

Examples 21-30: Aggregate Material Comprises Sand, Calcium Carbonate, Fumed Silica, or a Combination Thereof

| | Example No. | | | | | | | | | |
|---|---|---|---|---|---|---|---|---|---|---|
| | 21 | 22 | 23 | 24 | 25 | 26 | 27 | 28 | 29 | 30 |
| INCI Name | Amount (g) | | | | | | | | | |
| chalk - ultra fine calcium carbonate | 840 | 1014 | 0 | 840 | 0 | 1068 | 0 | 1381.2 | 0 | 0 |
| sand | 0 | 0 | 840 | 0 | 1068 | 0 | 1239 | 0 | 1014 | 1416 |

-continued

|  | Example No. | | | | | | | | | |
|---|---|---|---|---|---|---|---|---|---|---|
|  | 21 | 22 | 23 | 24 | 25 | 26 | 27 | 28 | 29 | 30 |
| INCI Name | Amount (g) | | | | | | | | | |
| chalk - precipitated calcium carbonate | 348 | 174 | 348 | 576 | 348 | 348 | 0 | 0 | 174 | 0 |
| fumed silica | 0 | 0 | 0 | 0 | 0 | 0 | 47 | 34.8 | 0 | 0 |
| total filler | 1188 | 1188 | 1188 | 1416 | 1416 | 1416 | 1286 | 1416 | 1188 | 1416 |
| total formula | 1542 | 1542 | 1542 | 1770 | 1770 | 1770 | 1640 | 1770 | 1542 | 1770 |

The test data collected for Examples 21-30 measured according to the method described above are provided in the table below:

|  | Example No. | | | | | | | | | |
|---|---|---|---|---|---|---|---|---|---|---|
|  | 21 | 22 | 23 | 24 | 25 | 26 | 27 | 28 | 29 | 30 |
| Flexural strength (Mpa) | 7.31 | 4.54 | 18.3 | 12.2 | 21.1 | 8.4 | 20.65 | 5.35 | 18.6 | 19.54 |

To provide comparison between Applicant's grout compositions, storable with the exclusion of water, and crosslinkable upon ingress of water at room temperature and commercially available grouts, the table below presents properties of commercially available grouts. * denotes ANSI A118.3 Standards,  denotes ANSI A118.6 Standards, * denotes ANSI A118.7 Standards, which were used to assess various properties of the commercially available grouts listed below. A value without an asterisk indicates that the data was listed in the product's specification.

|  | Type of Grout | | | |
|---|---|---|---|---|
|  | Epoxy 2K* | Typical Commerical RTU Water-Based Acrylic | Typical Cementitious Grout** | Typical Polymer Modifed Cementitious Grout*** |
| Water-Absorption 24 Hour (%) | 0.29 | 12.5 | >10** | >5*** |
| Flexural Strength (MPa) | 22.06 | 6.38 | 3.45** | 6.89*** |
| Flexural Strength (psi) | 3200 | 925 | 500** | 1000*** |
| Tensile Strength (MPa) | 6.89* | 1.47 | 2.07** | 3.45*** |
| Tensile Strength (psi) | 1000* | 213 | 300** | 500*** |
| Shore D Durometer | 75 | 30 | 80 | 75 |
| Wet Shore D Durometer | 73 | 5 | 80 | 75 |
| Staining | 4 | 9 | 30 | 28 |

The inventive grout may be applied to different substrates such as ceramic tile, travertine tile, porcelain tile, slate, marble, faux wood, masonry walls, or the like to fill voids, seal joints, and create waterproof seal. The grout compositions, storable with the exclusion of water, and crosslinkable upon ingress of water at room temperature, may be stored in a container such as a caulking gun and extruded for easy application. After application of the grout to a void, a residual grout compositions, storable with the exclusion of water, and crosslinkable upon ingress of water at room temperature can be removed from the substrate using only soap and water. In addition to easy clean-up and performance advantage, the grout compositions, storable with the exclusion of water, and crosslinkable upon ingress of water at room temperature, does not suffer from volume shrinkage associated with the loss of water upon evaporation typical for commercially available grout listed in the table above.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A grout composition comprising:
   (A) 0.1-10 wt. % of an alkoxysilyl-terminated, urethane-group-containing polymer component of the formula:

$$Y\!-\![(CR^1_2)_b\!-\!SiR_a(OR^2)_{3-a}]_x \qquad (I),$$

wherein
   Y is an x-valent polymer radical bonded via nitrogen, oxygen, sulfur, or carbon,
   R is identical or different monovalent, optionally substituted, SiC-bonded hydrocarbon radical,
   $R^1$ is identical or different, and is a hydrogen or a monovalent, optionally substituted hydrocarbon radical, optionally bonded to carbon via nitrogen, phosphorus, oxygen, sulfur, or carbonyl group,
   $R^2$ is identical or different, and is a hydrogen or a monovalent, optionally substituted hydrocarbon radical,
   x is an integer from 1 to 10,
   a is identical or different and is 0, 1, or 2,
   b is identical or different and is an integer from 1 to 10;
   (B) 0.1-30 wt. % of a silicone resin component comprising units of the formula $$R^3_c(R^4O)_d SiO_{(4-c-d)/2} \qquad (II),$$

wherein
   $R^3$ is identical or different, and is a hydrogen or a monovalent, SiC-bonded, optionally substituted hydrocarbon radical,
   $R^4$ is identical or different, and is a hydrogen or a monovalent, optionally substituted hydrocarbon radical,
   c is 0, 1, 2, or 3, and
   d is 0, 1, 2, or 3,
   wherein the sum of c+d≤3 and in at least 50% of the units of the formula (II) c=0 or 1;
   (C) 0.1-5 wt. % of surfactant(s);
   (D) 50-95 wt. % of aggregate;
   and optionally:
   (E) 0-5 wt. % of alkoxy silane(s);
   (F) 0-5 wt. % of catalyst(s);
   (G) 0-5 wt. % of additives;
   (H) 0-5 wt. % of adhesion promoters; and
   (I) 0-5 wt. % of water scavengers,
   wherein the grout composition is a storage stable water-free grout composition.

2. The grout of claim 1, wherein the amount of the components (A), (B), (C) and any optional component is about 10-20 wt. % based on the total weight of the polymer grout before curing.

3. The grout of claim 1, wherein the aggregate comprises sand, calcium carbonate, or a mixture thereof.

4. The grout of claim 3, wherein the aggregate comprises a mixture of particles having sieve sizes of 0.02 mm to 1.0 mm.

5. The grout of claim 1, wherein the aggregate is a mixture of calcium carbonate with mean particle size 15-25 μm, calcium carbonate with mean particle size of less than 10 μm, and sodium-potassium alumina silicate.

6. The grout of claim 1, wherein the aggregate comprises a mixture of sand with a sieve size of 0.25 mm to 0.33 mm, sand with sieve size of 0.21 mm to 0.25 mm, and sand with sieve size of 0.177 mm to 0.21 mm.

7. The grout of claim 1, wherein the surfactant is a non-ionic fluorosurfactant.

8. The grout of claim 1, wherein the (A) component comprises dimethoxymethylsilylmethylcarbamate-terminated polyether.

9. The grout of claim 1, wherein the (E) component comprises a mixture of N-(2-Aminoethyl)-3-aminopropyltrimethoxysilane and vinyltrimethoxysilane.

10. The grout of claim 1, wherein the grout is cleanable with soap and water after application to a substrate.

11. The grout of claim 10, wherein the substrate is a ceramic tile, travertine tile, porcelain tile, slate, marble, faux wood, or a masonry wall.

12. The grout of claim 1, wherein the out composition is a one-component composition.

* * * * *